(12) United States Patent
Potanin et al.

(10) Patent No.: US 7,436,152 B1
(45) Date of Patent: Oct. 14, 2008

(54) METHOD AND SYSTEM FOR CHARGE CURRENT CONTROL

(75) Inventors: Vladislav Potanin, San Jose, CA (US); Elena Potanina, San Jose, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 55 days.

(21) Appl. No.: 10/652,991

(22) Filed: Aug. 28, 2003

(51) Int. Cl.
*H02J 7/04* (2006.01)
(52) U.S. Cl. .................... 320/162; 320/160
(58) Field of Classification Search ............ 320/162, 320/160, 152, 149, 134, 130, 154
See application file for complete search history.

(56) References Cited

U.S. PATENT DOCUMENTS

| | | | | |
|---|---|---|---|---|
| 5,554,921 A | * | 9/1996 | Li et al. ................... | 320/106 |
| 5,710,506 A | * | 1/1998 | Broell et al. .............. | 320/145 |
| 6,333,621 B2 | * | 12/2001 | Yamashita ................ | 320/160 |

* cited by examiner

*Primary Examiner*—Adolf Berhane
*Assistant Examiner*—Aaron Piggush (57) ABSTRACT

A charge current control system is disclosed. One embodiment of the present invention includes a voltage detecting component that determines whether voltage stored by a load is at a voltage threshold. Also included are current supplying components that supply a charge current to the load that attains a plurality of magnitudes. The supply of the charge current is facilitated by a single charge current pass component over the course of a charge cycle. The magnitude of the charge current is based on the outcome of a determination of whether the minimum voltage threshold is reached.

11 Claims, 7 Drawing Sheets

METHOD AND SYSTEM FOR CHARGE CURRENT CONTROL

This application is related to U.S. patent application Ser. No. 10/652,990, by V. Potanin et al., entitled "POWER-LIMITING CIRCUIT," filed Aug. 28, 2003, and assigned to the assignee of the present invention.

TECHNICAL FIELD

The present invention relates generally to methods and systems for charge current control. In particular, embodiments of the present invention relate to methods and systems for battery charge current control.

BACKGROUND ART

The proliferation of portable devices in recent years has highlighted the need for small, efficient rechargeable batteries and battery chargers. As a result, there have been great strides in battery technology. To get the best performance from the batteries that have been developed, designers have dedicated some of their focus to making improvements in battery charger technology. Assuring that battery charger technology keeps pace with advances made in rechargeable battery technology assures the fullest use of a given rechargeable battery's capacity to store and supply electrical power.

Conventional charge systems for rechargeable batteries usually have two phases, a first phase for providing initial charge (when at the beginning of a charge cycle and the battery is completely depleted) and a second phase for providing full rate charge. The second phase is entered into directly when a battery to be charged has at least certain minimum voltage. For one cell Lithium Ion batteries that voltage is about three volts.

It should be appreciated that the magnitude of the charge current can be different at different points in the charge cycle. In some conventional systems, when the battery voltage lies between 0 and 3 volts one current level is generated and above 3 volts another current level is generated. As a result two separate power control devices are needed for pre-charge and full rate charge control current.

Figure 1:
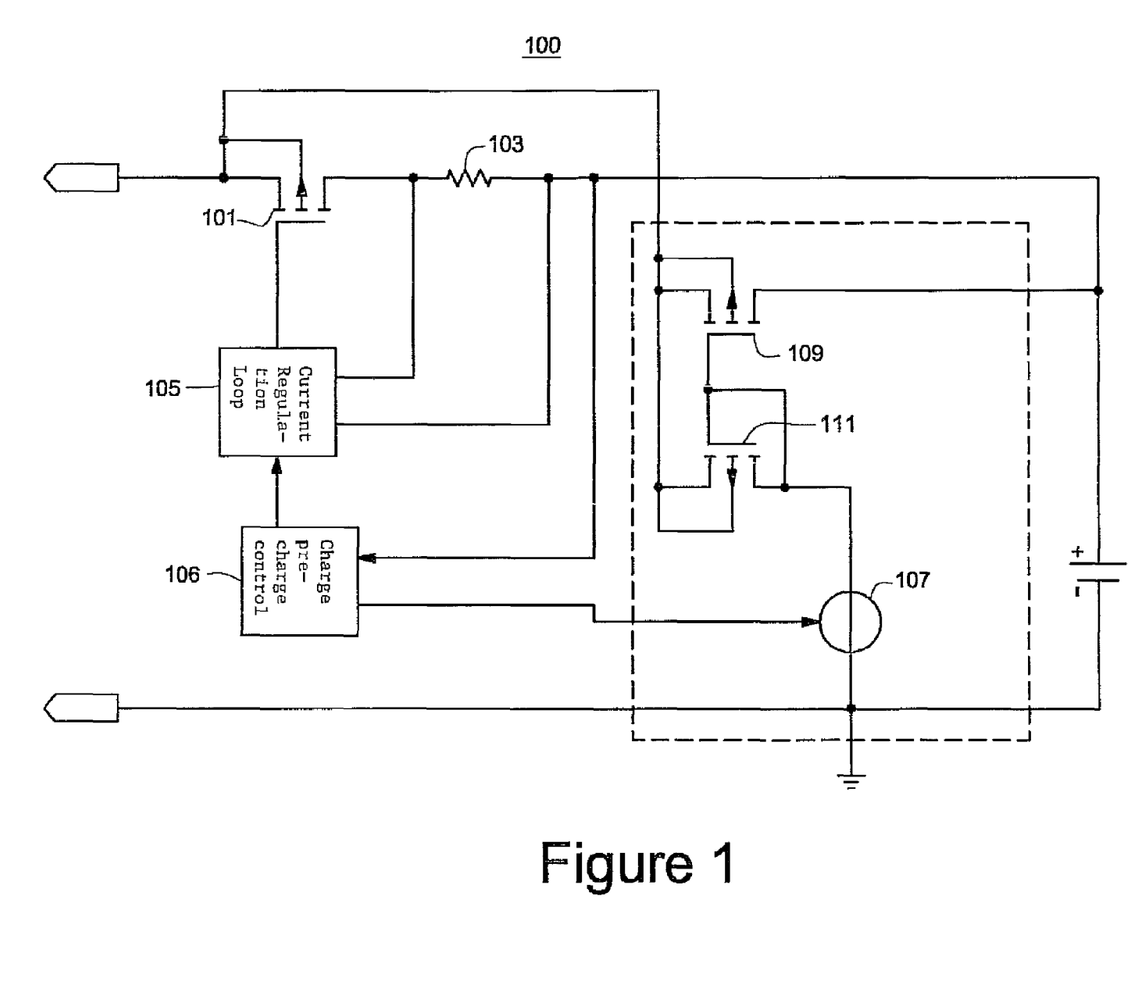
FIG. 1 shows a conventional battery charger topology.

FIG. 1 shows a conventional battery charger topology 100. The battery charger shown in FIG. 1 includes a main pass part that comprises p type MOSFET 101, sense resistor 103, and full rate current regulation loop circuit 105, and a pre-charge pass part that comprises charge pre charge control 106, charge pre charge control current reference 107 (e.g., Ipre-charge) and transistors 109 and 111.

Some conventional battery charging systems, such as that shown in FIG. 1, use two charge current pass control devices and two support control circuits. A first pass control device and support circuitry (e.g., 101-105) for the pre-charge charge cycle phase and a second pass control device and support circuitry (e.g., 106-111) for the full rate charge cycle phase. Managing the cooperation between the circuits in order to optimally provide pre-charge and full rate charge current control can pose a significant problem. Many conventional systems do not manage the challenges presented by this circuit structure adequately. As a consequence, some of these systems exhibit low accuracy of pre-charge current and thus do not perform well when they are employed to charge a battery where the charge stored by the battery has been completely depleted.

SUMMARY OF THE INVENTION

Accordingly, a need exists for a method and system for charge current control. The present invention provides a method and system that accomplishes this need.

One embodiment of the present invention provides a charge current control system. One embodiment of the present invention includes a voltage detecting component that determines whether voltage stored by a load is at a voltage threshold. Also, included are current supplying components that supply a charge current to the load that attains a plurality of magnitudes. The supply of the charge current is facilitated by a single charge current pass component over the course of a charge cycle. The magnitude of the charge current is based on the outcome of a determination of whether the voltage threshold has been reached.

One embodiment of the present invention provides a method for charge current control. The method includes determining whether the voltage stored by a load reaches a certain voltage threshold, and supplying a charge current to the load that has one or more magnitudes during the course of a charge cycle. Moreover, a single charge current pass component controls the supply of the charge current to the load over the course of the charge cycle. A magnitude of the charge current is based on the outcome of a determination of whether the voltage threshold has been reached.

These and other advantages of the present invention will no doubt become obvious to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification illustrate embodiments of the invention and, together with the description, serve to explain the principles of the invention.

DETAILED DESCRIPTION OF THE INVENTION

Reference will now be made in detail to embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, the present invention may be practiced without these specific details. In other instances, well known methods, procedures, components, and circuits have not been described in detail as not to unnecessarily obscure aspects of the present invention.

Figure 2:
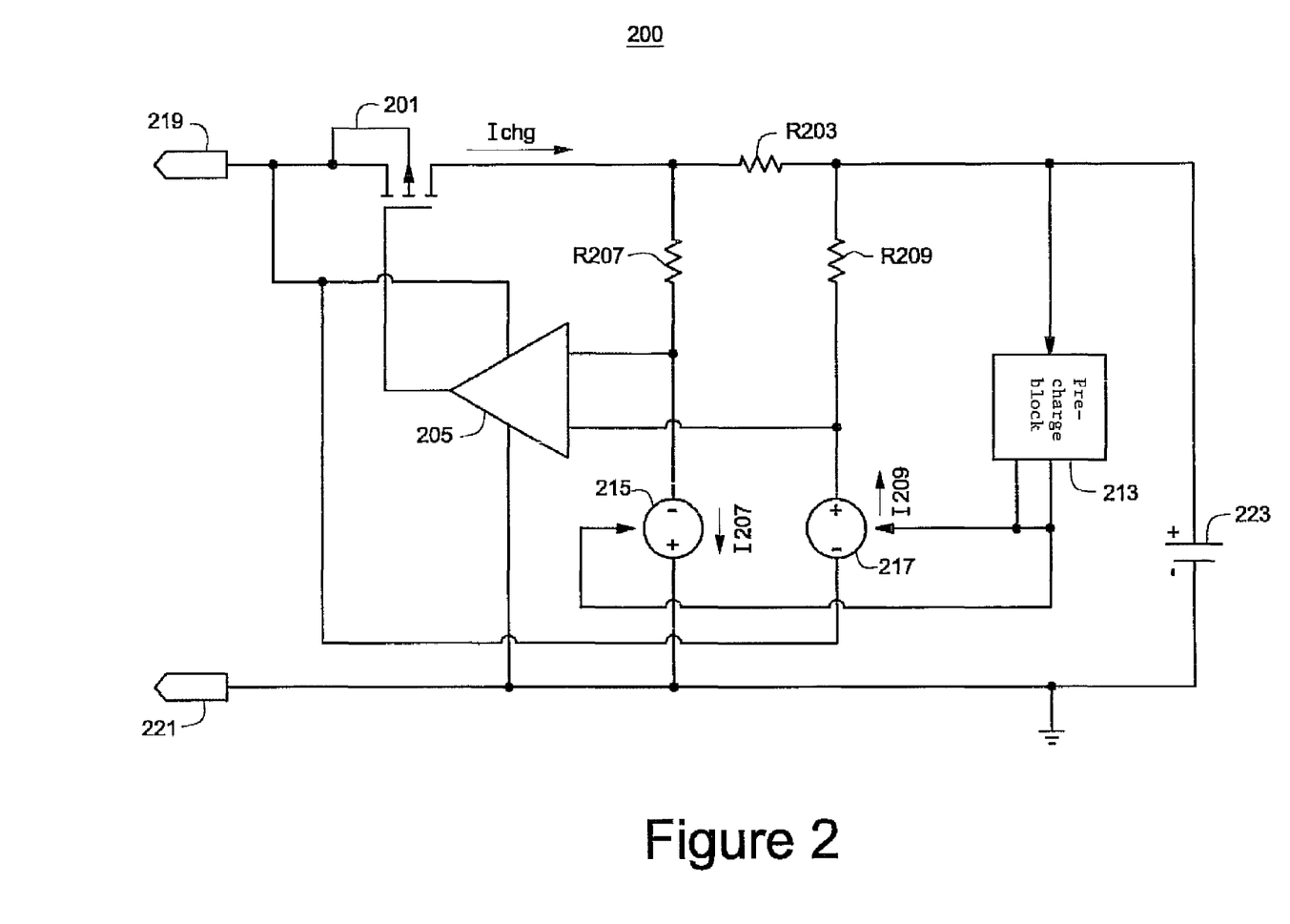
FIG. 2 is a block diagram of a single pass charge current control system according to one embodiment of the present invention.

Exemplary Charge Current Control System in Accordance with Embodiments of the Present Invention FIG. 2 is a block diagram of a single pass charge current control system 200 according to one embodiment of the present invention. The single pass charge current control system 200 of the present invention uses the same current control pass transistor and feedback amplifier throughout a charge cycle. By using the same pass transistor and feedback amplifier for controlling both pre-charge and full rate charge currents, embodiments of the present invention increase the accuracy of pre-charge current settings as a common feedback topology is used throughout a charge cycle. FIG. 2 shows p-type MOSFET 201, sense resistor R203, loop amplifier 205, resistor R207, resistor R209, reference current I207, reference current I209, charge/pre-charge control 213, current source 215, current source 217, charge current $I_{Chg}$, Vin 219, Gnd 221 and load (e.g., battery) 223.

According to one embodiment, the charge cycle of the charge control circuit 200 has two phases: (1) a pre-charge phase, and (2) a full rate charge phase. According to one embodiment, when a completely charge depleted load 223 such as an uncharged battery is to be charged by charge control circuit 200, the pre-charge phase of the charge cycle may be initiated.

When the pre-charge phase of a charge cycle is entered, the charge-pre-charge control block 213 is activated. The activation of the pre-charge block 213 causes a setting of a reference current I209 value. In turn, the establishment of the reference current I209 value causes the creation of a voltage drop across resistor R209. According to one embodiment, when this occurs the current control loop components (amplifier 205 and transistor 201) react and adjust the charge current Chg so that the voltage drop across sense resistor R203 may be equal to the voltage drop across resistor R209. At this point the charge current $I_{Chg}$ value may be given by the following equation:

$$I_{Chg}=I209*R209/R203$$

When the charge on the load 223 reaches a predetermined threshold, the control block 213 may activate current source 215 and deactivate current source 217. As a result, the voltage drop across resistor R209 may collapse to approximately 0 volts. At this point, reference current I207 may create a voltage drop across resistor R207 that may trigger an adjustment in the charge current $I_{chg}$ whose value may then be given by the equation:

$$I_{Chg}=I207*R207/R203$$

Thus, the embodiment of FIG. 2 uses a single pass transistor (e.g., transistor 201) for both pre-charge and full rate charge phases of the charge cycle.

As discussed herein, the utilization of a single pass transistor to control the supply to the battery of both pre-charge phase and full rate phase charge currents increases the accuracy of the pre-charge phase current setting because a common feedback circuit topology is used throughout the charge cycle. Consequently, inaccuracies may be prevented that arise when more than one feedback circuit topology is utilized during a charge cycle.

According to one embodiment, it is important that the charge current controlling circuit components receive power from the charge control system 200 input side (e.g., 219 and 221) either directly or through a regulation circuit as the circuits are configured to operate even when the load 223 voltage is 0V.

Figure 3:
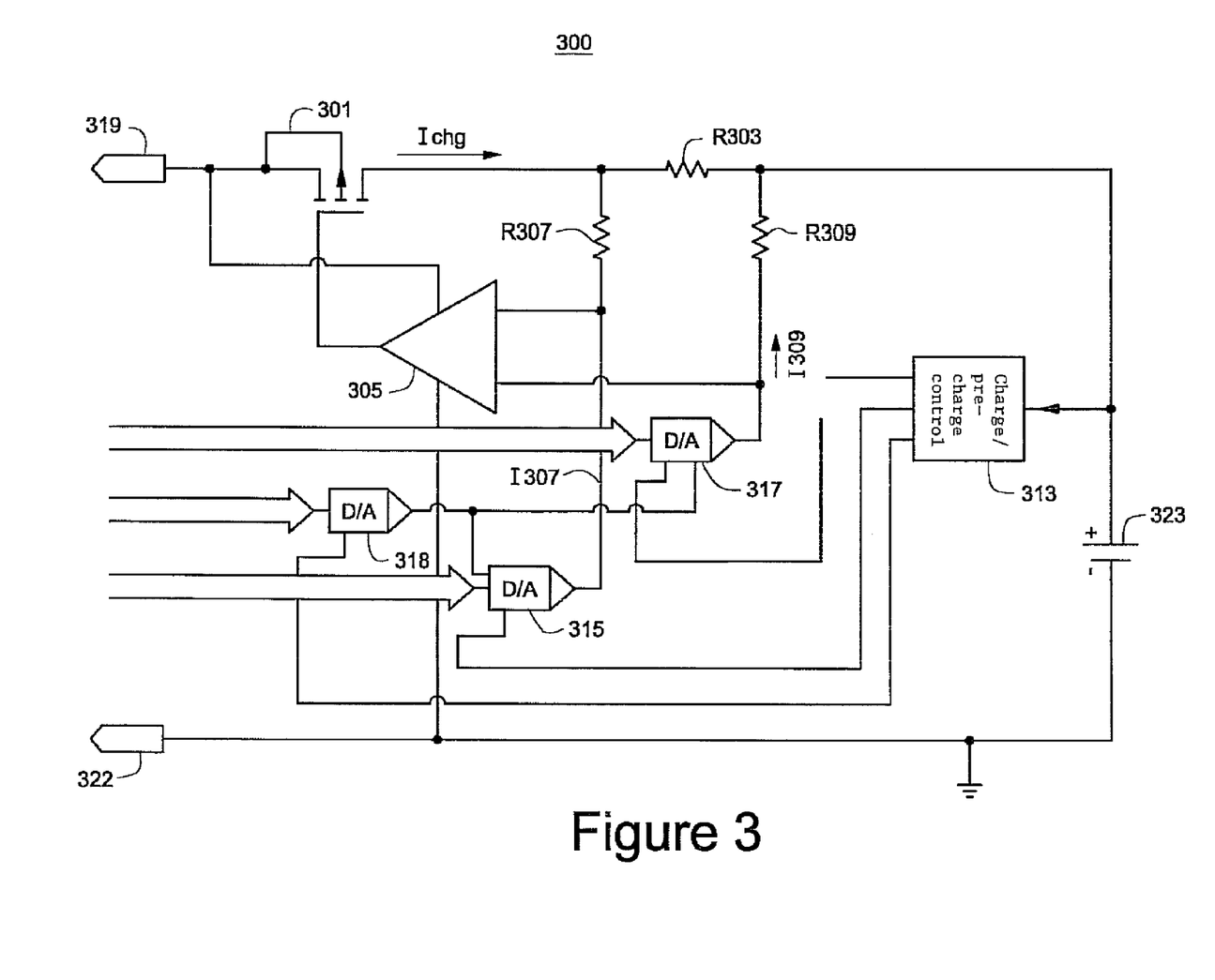
FIG. 3 is a circuit diagram of a one pass digitally controlled charge current control system according to one embodiment of the present invention.

According to one embodiment, the single pass charge current control system may include reference current sources that may be implemented with current output digital to analog (D/A) converters (see FIG. 3 and accompanying discussion). Moreover, a current output digital to analog (D/A) converter may be utilized to provide a trimming current to help manage the effects of component process variation. In addition, other D/A converters may be employed as a means of programming the full rate and pre-charge charge currents through the supply of a digital code to a current setting analog to digital (A/D) converter (not shown).

FIG. 3 is a circuit diagram of a one pass digitally controlled charge current control system 300 according to one embodiment of the present invention. FIG. 3 shows p-type MOSFET 301, sense resistor R303, loop amplifier 305, resistor R307, resistor R309, charge/pre-charge control 313, D/A converter 315, D/A converter 317, D/A converter 318, reference current I309, reference current I307, charge current $I_{chg}$, Vin 319, ground 322 and battery 323.

Aspects of the one pass digitally controlled charge current control system shown in FIG. 3 operate analogously to the circuit described with reference to FIG. 2. In the place of current sources (e.g., FIG. 2, 215, 217), D/A converters 315 and 317 may be employed as the reference current generating components. Moreover, D/A converter 318 may be employed as a current trimming mechanism. It should be appreciated that D/A converter 318 may include internal or external constant bias current and may be used to eliminate the effects of resistor process variation. This feature represents an important functionality as sense resistor R303 has a very small value as compared to the value of reference voltage setting resistors R307 and R309, in one embodiment. A trimming mechanism provides a means of managing challenges that may arise in achieving accurate and repeatable resistor ratios due to resistor process variation.

According to one embodiment, the activation of pre-charge block 313 causes D/A converter 317 to generate a reference current I309 of a predetermined value. In turn, the establishment of the reference current I309 value causes the creation of a voltage drop across resistor R309. According to one embodiment, when this occurs the current control loop components (e.g., amplifier 305 and transistor 301) react and adjust the charge current $I_{Chg}$ so that the voltage drop across sense resistor R303 may be equal to the voltage drop across resistor R309. It should be appreciated that the charge current $I_{Chg}$ value at this point may be given by the following equation:

$$I_{Chg}=I309*R309/R303$$

When the charge on the load 323 reaches a certain predetermined threshold, the control block 313 may activate D/A converter 315 and deactivate D/A converter 317. As a consequence, the voltage drop across resistor R309 may collapse to approximately 0 volts. At this point reference current I307 may create a voltage drop across resistor R307 that may trigger an adjustment in the magnitude of the charge current whose value then may be given by the equation:

$$I_{Chg}=I307*R307/R303$$

As discussed above, D/A converter 318 may include an internal or an external constant bias current that may be used to manage the effects of resistor process variation. According to one embodiment, sense resistor R303 may be small (e.g., 0.1 Ohm) and may be implemented as a piece of metal on a chip or printed circuit board (PCB). Resistors R307 and R309, which according to one embodiment may be more resistive than the sense resistor R303, may be implemented using other materials (e.g., polysilicon etc.). As previously discussed, bias current trimming may be employed using D/A converter 318 so that an accurate and repeatable resistor ratio may be achieved.

According to one embodiment, charge pre-charge control 313 may be an independent component that relies only on battery provided power. Moreover, pre-charge control 313 may be digitally controlled. Digital control capacity allows the charge pre-charge control 313 to monitor load (e.g., 323) voltages and to compare the detected voltages to digitally provided signals. According to one embodiment, the charge pre charge control 313 may have the capacity to transmit data to a digital state machine (not shown) that may be configured to determine which D/A converter to activate and to determine the magnitude of the current that may be generated thereby. It should be noted that digital control facilitates pulse charging or pre charging, which may be preferable for some applications.

Figure 4:
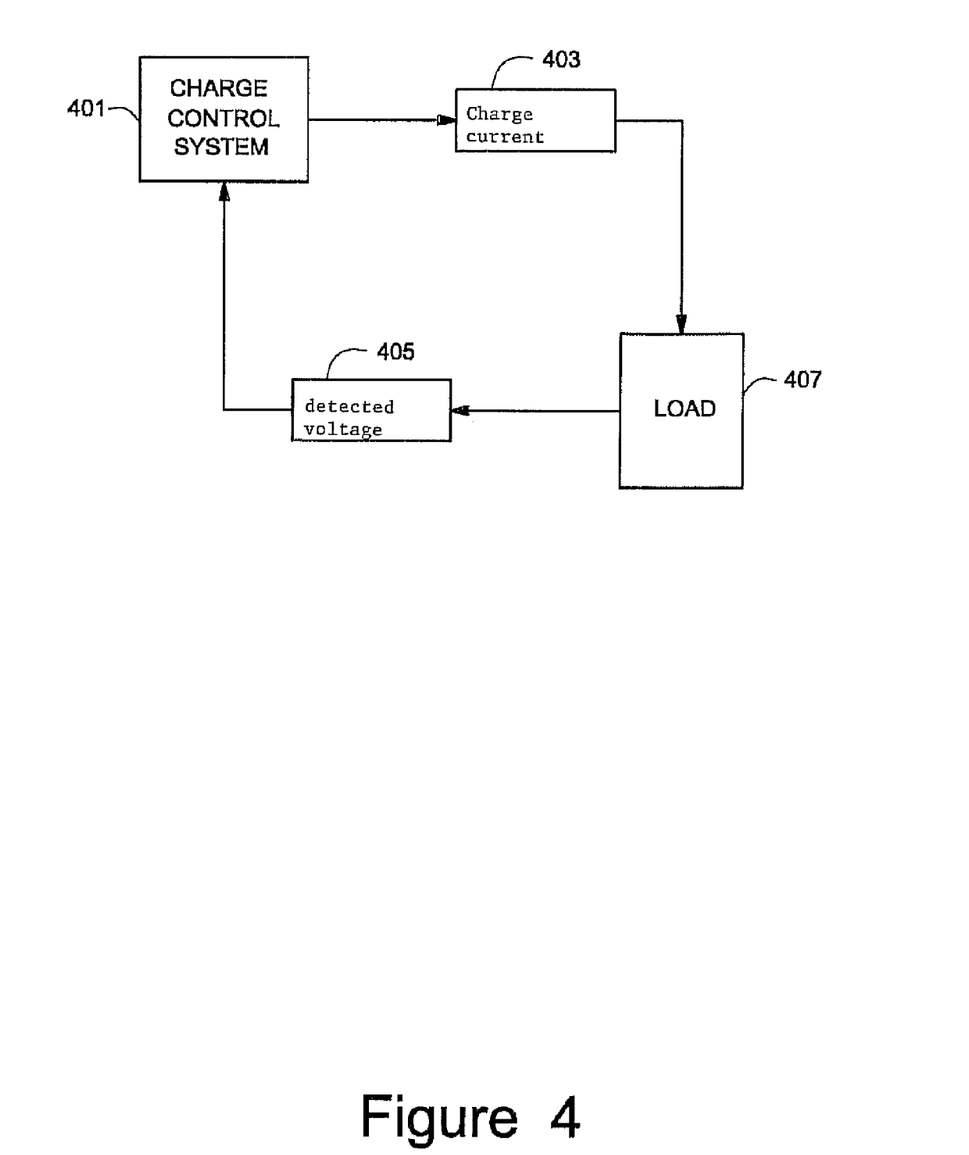
FIG. 4 is a functional block diagram illustrating the interrelationship between a charge current control system and its load according to one embodiment of the present invention.

FIG. 4 is a functional block diagram illustrating the interrelationship between a charge current control system and its load according to one embodiment of the present invention. FIG. 4 shows charge current control system 401 (e.g., 200, 300), charge current 403, detected voltage 405, and load (e.g., battery) 407. Current control system 401 detects the existing charge 405 (e.g., voltage) in load 407 and initiates the supply of charge current 403 to the load 407.

It should be appreciated that the magnitude of the charge current 403 that is supplied depends on the magnitude of the charge (e.g., 405) that is detected as being stored by the load 407. According to one embodiment, current control circuit 401 has two phases of operation: (1) a pre-charge phase which is characterized by the supply of a charge current that has a low magnitude, and (2) a full rate phase which is characterized by the supply of charge current that has a high magnitude.

The pre-charge phase is initiated if the charge current control system 401 detects a charge level (e.g., voltage) 405 being stored by the load that is below a certain minimum threshold. The full rate charge phase is initiated if the charge current control circuit 401 detects a charge level (e.g., voltage) 405 being stored by the load that is equal to or greater than a certain minimum threshold.

According to one embodiment, a single pass transistor of charge control system 401 (see discussions made with reference to FIGS. 2 and 3) is employed to control the supply to the battery of both the pre-charge phase and full rate phase charge current (e.g., 403). As discussed herein, the utilization of a single pass transistor to control the supply to the battery of both pre-charge phase and full rate phase charge currents increases the accuracy of the pre-charge phase current setting because a common feedback circuit topology is used throughout the charge cycle. Consequently, inaccuracies may be prevented that arise when more than one feedback circuit topology is utilized during a charge cycle.

Figure 5A:
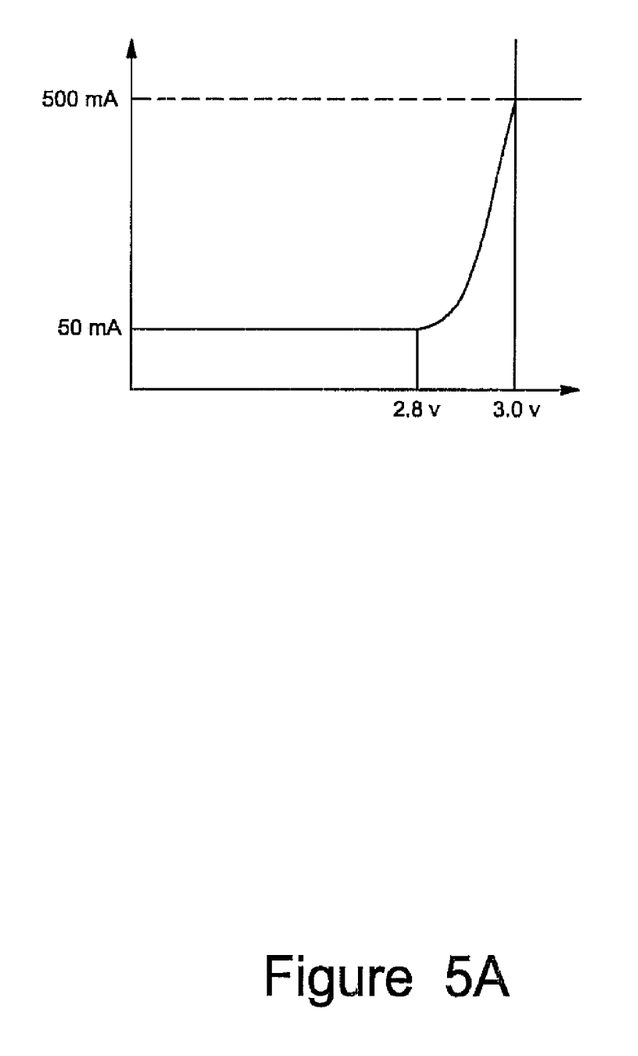
FIG. 5A illustrates a case in which a gradual transition is made from an initial charge current setting to a second setting according to one embodiment of the present invention.
Figure 5B:
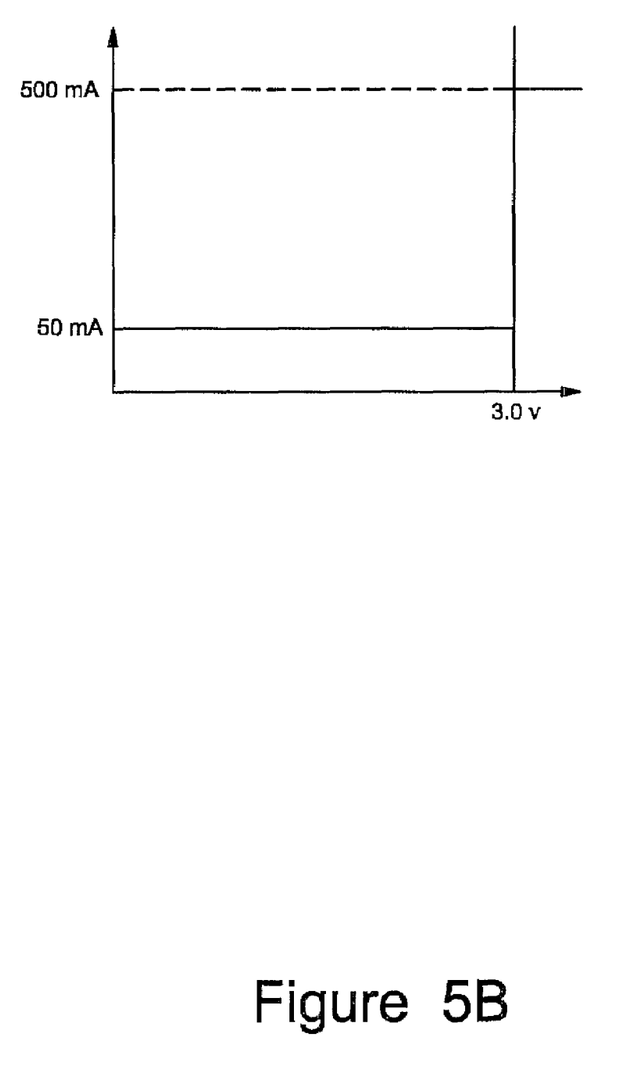
FIG. 5B illustrates a case in which a sharp transition is made from an initial charge current setting to a subsequent charge current setting according to one embodiment of the of the present invention.

FIGS. 5A and 5B are graphs that illustrate charge current behavior when the charge current control circuit triggers a change in charge cycle phase according to one embodiment of the present invention. It should be appreciated that transitions between charge cycle phases can be gradual or immediate.

FIG. 5A illustrates a case in which a gradual transition is made from an initial charge current setting to a second setting. In such cases, as illustrated in FIG. 5A, the charge current gradually rises from an initial setting that corresponds to the pre-charge phase of the charge cycle to a second setting that corresponds to the full rate charge phase of the charge cycle. According to the example shown in FIG. 5A, the charge current is initially set to a magnitude of 50 mA. When the load voltage reaches 2.8 volts the charge current begins to rise gradually until it reaches 500 mA at 3 volts.

FIG. 5B illustrates a case in which a sharp transition is made from an initial charge current setting to a subsequent charge current setting. In such cases, as illustrated in FIG. 5B, the charge current rises sharply from an initial setting that corresponds to the pre-charge phase of the charge cycle to a second setting that corresponds to the full rate charge phase of the charge cycle. According to the example shown in FIG. 5B, the charge current is initially set to a have magnitude of 50 mA. It should be appreciated that when the load voltage reaches 3 volts the charge current is sharply switched to a magnitude of 500 mA.

Exemplary Operations in Accordance With Embodiments of the Present Invention

Figure 6:
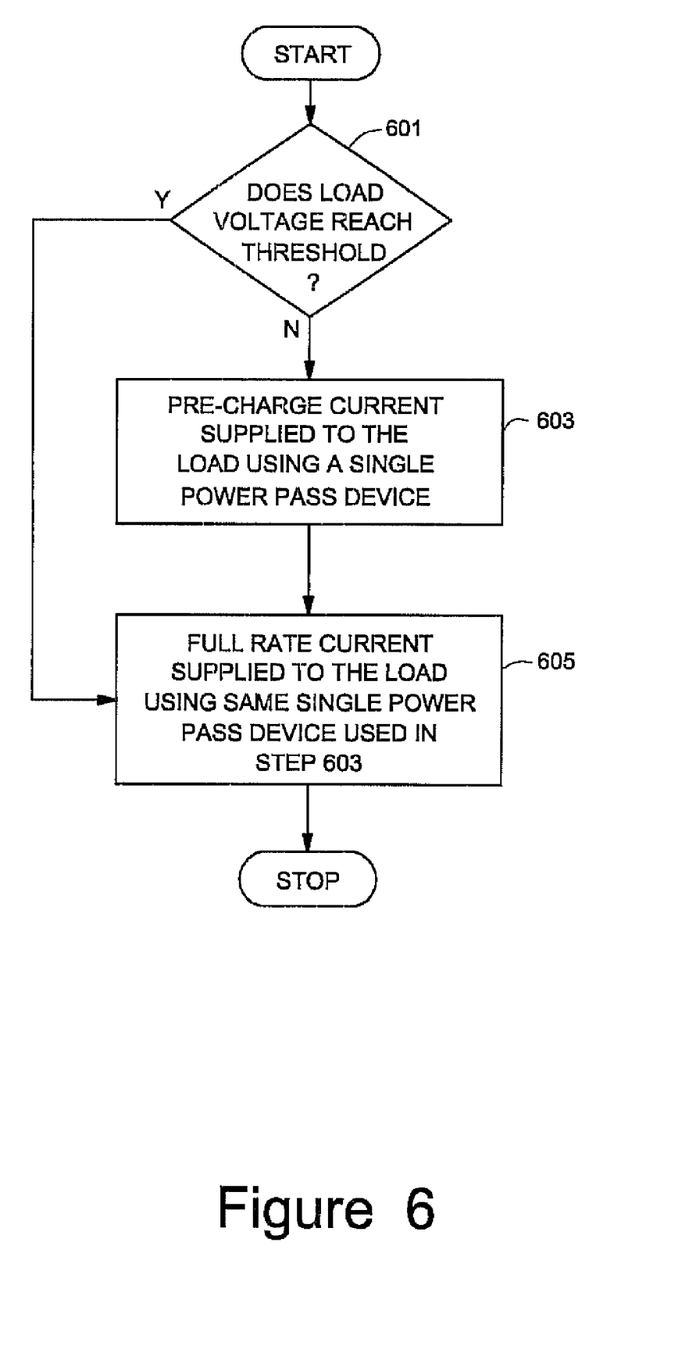
FIG. 6 shows a flowchart of steps performed in accordance with embodiments of the present invention.

FIG. 6 shows a flowchart of the steps performed in accordance with embodiments of the present invention. The flowcharts include processes of the present invention which, in one embodiment, are carried out by processors and electrical components under the control of computer readable and computer executable instructions. The computer readable and computer executable instructions reside, for example, in data storage features such as computer usable volatile memory and/or computer usable non-volatile. However, the computer readable and computer executable instructions may reside in any type of computer readable medium. Although specific steps are disclosed in the flowchart, such steps are exemplary. That is, the present invention is well suited to performing various other steps or variations of the steps recited in FIG. 6. Within the present embodiment, it should be appreciated that the steps of the flowchart may be performed by software, by hardware or by any combination of software and hardware.

At step 601, it is determined whether the voltage stored by a load reaches a minimum voltage threshold. It should be noted that if the load voltage is less than the minimum voltage threshold, then the operations of step 603 are executed. However, if it is determined that the load voltage reaches or exceeds the minimum voltage threshold, then the operations of step 605 are executed.

At step 603, a pre-charge charge current is supplied to the load using a power pass device. The magnitude of the charge current is set at a level that is calculated to charge the load to a predetermined pre-charge threshold. According to one embodiment, the pre-charge current setting for the pre-charge phase of the charge cycle may be given by:

$$I_{Chg} = I209 * R209/R203$$

When the load reaches the predetermined pre-charge threshold, the magnitude of the charge current is adjusted to full rate charge setting at step 605.

At step 605, a full rate charge current is supplied to the load using the same power pass device as used in step 603. In addition, a common feedback topology is used throughout the charge cycle as previously discussed herein. The magnitude of the charge current is set to a level that is calculated to fully charge the load.

The full rate charge current corresponds to the full rate charge cycle phase. According to one embodiment the full rate current setting for the full rate phase of the charge cycle may be given by:

$$I_{Chg}=I207*R207/R203$$

It should be appreciated that, as is described in the discussion above, the charge current may attain one or more magnitudes (have one or more settings) during the course of a charge cycle. Moreover, it should be noted that where a load voltage initially exceeds the predetermined charge threshold the full rate charging phase of the charge cycle may be immediately commenced.

Advantages of the invention include the capacity to perform optimally when a load is fully depleted. Moreover, charge current accuracy is fostered by the use of the same pass device and feedback topologies for both pre-charge and full rate charge phases of a charge cycle. It should be appreciated that, according to one embodiment, the pre-charge charge current may be fixed and the full rate charge current may be variable.

As noted above with reference to exemplary embodiments thereof, the present invention provides a method for charge current control. The method includes determining whether the voltage stored by a load reaches a certain minimum voltage threshold, and supplying a charge current to the load that has one or more magnitudes during the course of a charge cycle. Moreover, a single charge current pass component controls the supply of the charge current to the load over the course of the charge cycle. A magnitude of the charge current is based on the outcome of a determination of whether the minimum voltage threshold has been reached.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A charge current control system, comprising:
    a pass transistor for delivering pre-charge and full-rate magnitude charge current to a load;
    a sense resistor coupled to said pass transistor;
    a first resistor coupled to said sense resistor;
    a second resistor coupled to said sense resistor;
    a control amplifier coupled to said sense resistor;
    a first controlled current source coupled to said control amplifier and associated with said pre-charge current;
    a second controlled current source coupled to said control amplifier and associated with said full rate magnitude charge current; and
    a charge control block coupled to said first controlled current source and said second controlled current source,
    wherein the magnitude of said pre-charge current is equal to the magnitude of current through said first resistor times the magnitude of the resistance of said first resistor divided by the magnitude of the resistance of said sense resistor and wherein the magnitude of said full-rate charge current is equal to the magnitude of current through said second resistor times the magnitude of the resistance of said second resistor divided by the magnitude of the resistance of said sense resistor.

2. The current control system of claim 1 wherein the supply of said pre-charge and full rate magnitude charge current is facilitated by a single charge current pass component over the course of a charge cycle.

3. The current control system of claim 1 wherein a magnitude of said pre-charge current is determined by a pre-charge circuit block.

4. The current control system of claim 3 wherein a magnitude of said full-rate charge current is determined by a full-rate current control loop.

5. The current control system of claim 1 wherein said sense resistor is located between said pass transistor and said load.

6. A battery charger comprising:
    a pass transistor for delivering pre-charge and full-rate magnitude charge current wherein the supply of said charge current at said pre-charge and said full-rate charge is facilitated by a charge current pass component and a single feedback system over the course of a single charge cycle, and wherein a magnitude of said charge current is based on a determination of whether said voltage threshold has been reached;
    a sense resistor coupled to said pass transistor;
    a first resistor coupled to said sense resistor;
    a second resistor coupled to said sense resistor;
    a control amplifier coupled to said sense resistor;
    a first controlled current source coupled to said control amplifier and associated with said pre-charge current;
    a second controlled current source coupled to said control amplifier and associated with said full rate magnitude charge current; and
    a charge control block coupled to said first controlled current source and said second controlled current source,
    wherein the magnitude of said pre-charge current is equal to the magnitude of current through said first resistor times the magnitude of the resistance of said first resistor divided by the magnitude of the resistance of said sense resistor and wherein the magnitude of said full-rate charge current is equal to the magnitude of current through said second resistor times the magnitude of the resistance of said second resistor divided by the magnitude of the resistance of said sense resistor.

7. The battery charger of claim 6 further comprising a pre-charge circuit which controls said magnitude of said pre-charge current.

8. The battery charger of claim 7 further comprising a full-rate current control loop which controls said magnitude of said full-rate charge current.

9. The battery charger of claim 6 wherein a magnitude of said charge current corresponds to a charge current control state.

10. The battery charger of claim 9 wherein said charge current control state comprises a full-rate state and a pre-charge state.

11. The battery charger of claim 8 wherein current sources that are associated with said pre-charge circuit block and said full-rate current control loop respectively are digitally programmed.

* * * * *